Jan. 14, 1930.  J. S. FULLER  1,743,127
AUTOMATIC CONTROL MECHANISM FOR FUEL GASES
Filed April 11, 1929
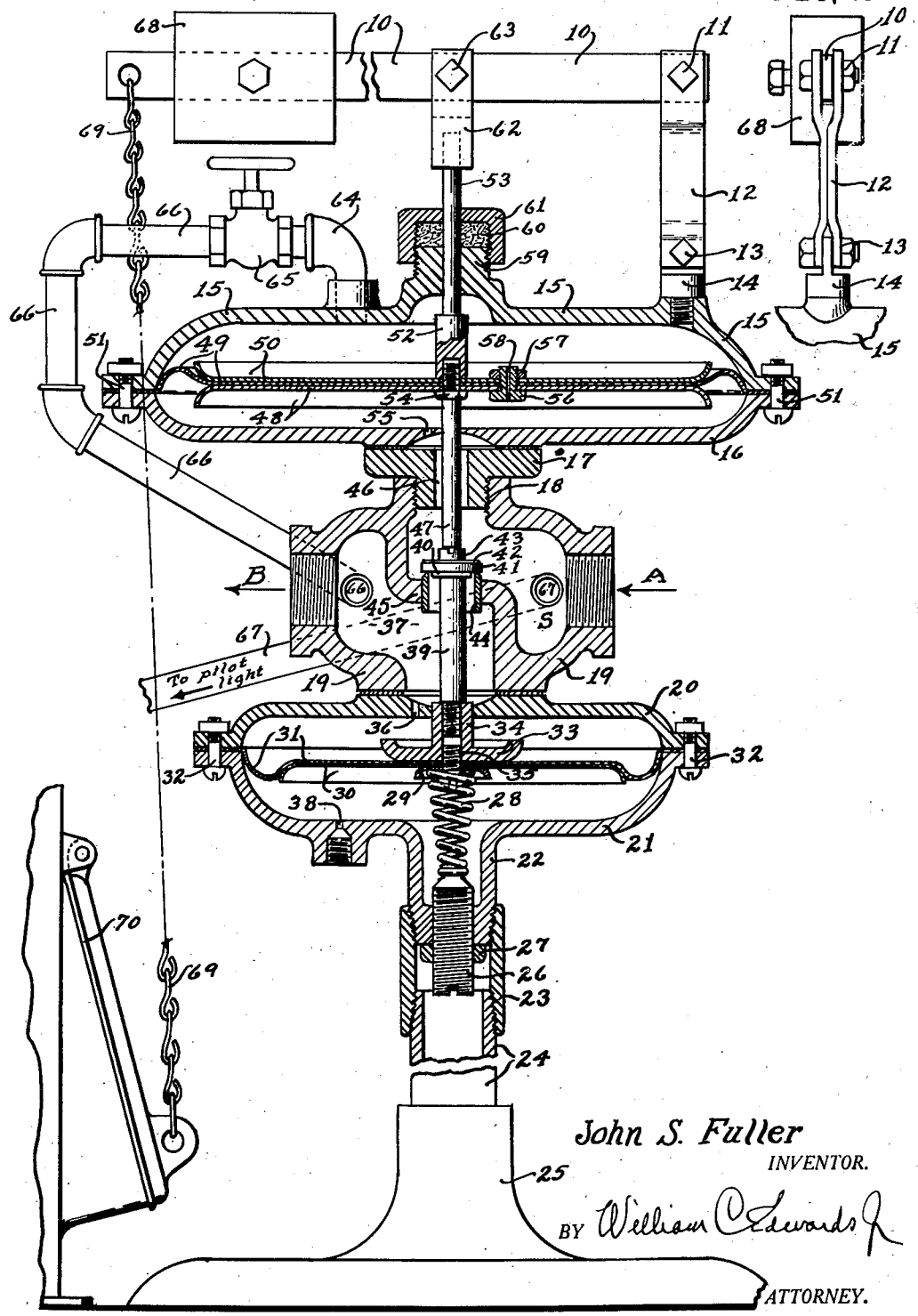
John S. Fuller
INVENTOR.
BY William C. Edwards Jr.
ATTORNEY.

Patented Jan. 14, 1930

1,743,127

UNITED STATES PATENT OFFICE

JOHN S. FULLER, OF WINFIELD, KANSAS, ASSIGNOR TO THE SONNER BURNER CO., OF WINFIELD, KANSAS

AUTOMATIC CONTROL MECHANISM FOR FUEL GASES

Application filed April 11, 1929. Serial No. 354,299.

The invention relates to a mechanism useful in providing an even predetermined pressure to the fuel gas at the gas appliance or burner, at all times; for example, the pressure of the gas in the main may vary, it might be ten pounds at one time, or it might be fifteen pounds, but by means of my mechanism I am enabled to adjust and supply the burner with any selected pressure, say two, three or four ounces and I can maintain this selected pressure at all times though the feed pressure may vary.

Other objects are to provide a mechanism of the type described above and which will also serve as the main cut off valve of the gas appliance. Another object is to provide a mechanism as above described which is also adapted to open and close draft dampers on furnaces, boilers and the like. Another object is to provide a mechanism of the type described above and which may also be used to maintain a predetermined steam pressure in a boiler or to maintain a certain temperature in a room or bulding and where the mechanism is used in connection with the heating boilers or furnaces. These and other objects will be more fully discussed and explained during the description of the drawings.

In the drawings: Fig. 1 is a sectional view of my improved mechanism. Fig. 2 represents an end view of the upper part of Fig. 1. Similar numerals of reference indicate corresponding parts throughout the drawings.

Referring to the drawings: at 10 is shown a lever arm pivotally connected at 11 to a link 12, which in turn is pivotally supported at 13 to a stud 14 screwed into the upper part 15 of a diaphragm enclosure. At 16 is seen the lower member of the diaphragm enclosure. A member 17 is rigidly attached to and below the member 16 by means not shown. This member 17 has a portion which screws into the valve body as seen at 18. The body 19 of the valve rigidly attaches by means not shown to the upper element 20 of a second diaphragm enclosure, the lower element of which is shown at 21. Depending from the member 21 is the portion 22 which is threaded into the pipe coupling 23, which in turn is threaded upon the pipe 24 upwardly extending from the floor support 25 as the base of the mechanism.

At 26 is an adjusting screw threaded through the base of the member 22 and a lock nut 27 screwed thereon seats against the element 22 to lock the screw in an adjusted position. At 28 is seen a spring element spanning intermediate the upper end of the screw 26 and a spring bearing cup 29. Above the cup 29 is a lower cupped bearing plate 30 supporting the leather diaphragm member 31 whose outer edge is clamped between the flanged edges of the members 20 and 21 by means of the bolts 32 as seen. At 33 is a circular member having upwardly flanged edge portion and with a centrally upwardly extending portion 34 passing through a passage in the member 20. At 35 is a screw threaded into the member 33 and passing the members 29 and 30 and whereby the members 29, 30, 31 and 33 are tightly clamped together. At 36 is a hole connecting the space above the diaphragm member 31 to the space 37 in the valve body 19.

At 38 is a hole below the diaphragm member 31 and passing through the member 21 to serve as an exhaust for the space below the member 31. At 39 is a shaft threaded into the member 34. Upon the upper end of the shaft 39 will be noted a washer 40, a leather valve washer 41 and another washer 42, all being held tightly together and in place on the shaft 39 by means of the screw 43 which is threaded into the upper end of the shaft 39. At 44 is a valve sleeve pressed into the valve division wall member 45. The upper part of the sleeve 44 is fashioned as a seat against which the washer 41 may rest to effect a valve opening and closing operation.

A hole 46 through the member 17 passes the shaft 47 and being larger in diameter than said shaft to also serve as a passage for gas. At 48 and 50 are shown diaphragm plates whose edges are oppositely turned for stiffening effects and between these plates 48 and 50 is a leather diaphragm member 49 whose outer edge is tightly clamped between the flanged edge portions of the members 15 and 16 by means of the bolts 51. At 52 is shown an enlarged portion of the shaft 53. The shaft 47 at its upper end threads into the element 52 and a nut 54 is employed to tightly clamp the plates 48 and 50 and the leather 49 against the end of the portion 52. The lower end of the shaft 47 merely rests upon the screw 43. At 55 is a hole in the member 16 to serve with the passage 46 as a connecting passage between the chamber S of the valve 19 and the space below the diaphragm 49. At 56 is a bolt passing through the members 48, 49 and 50 and held rigidly in place by the nut 57. Through the bolt 56 extends an extremely small hole 58 which connects the spaces above and below the member 49. The shaft 53 passes through a sleeve portion 59 of the member 15 and through the packing 60 which is held in place by the packing nut 61 as will be readily understood. The upper end of the shaft 53 is threaded into a U-shaped member 62 which is pivotally attached at 63 to the lever arm 10. At 64 is an L pipe connection entering the space above the diaphragm 49, 50 and connects through the valve 65 to the pipe 66 leading to the chamber 37 of the valve 19. At 67 is a pipe leading from the chamber S in the valve 19 to a pilot light of a gas burner. At 68 is a weight adapted to be slipped along the arm 10 for purposes of adjustment. At 69 a chain leads from the arm 10 to operate a draft door 70 on a boiler or furnace.

The operation of the mechanism is as follows: as manufactured or installed, the screw 26 is adjusted until the spring 28 exerts a pressure against the diaphragm 30 equal to the pressure desired to be fed to the burner, say three ounces. The gas entering the chamber S as indicated by the arrow A is under a pressure of say ten or fifteen pounds or whatever pressure it is in the main. The gas passes through the passage 46—55 and raises the diaphragm 48—49—50 thereby allowing the spring 28 to raise the diaphragm 30 and 31 and the washer 41; this allows the gas to pass from the chamber S to the chamber 37 and on to the burner as indicated by the arrow B. Now through the hole 36 gas passes to build up a pressure against the diaphragm 31 and as soon as the pressure equals or overcomes the spring 28, say the three ounces, the pressure will push the diaphragm 31 down thereby closing the valve 41. This action regulates and maintains the said pressure of three ounces of gas going to the burner as indicated by the arrow B. All during this time, the valve 65 has been open and gas passed in small quantities, due to the size of the hole, through the hole 58 and flowed through the pipe 66 into the chamber 37. At the time the diaphragm 48, 49, 50 raised, the lever arm 10 was also raised causing the chain 69 to pull open the draft door 70.

Now in order to turn off the burner, the small valve 65 is closed; a pressure then builds up above the diaphragm 48—49—50 equal to that fed in from the chamber S, so that there is no more gas pressure action on the diaphragm 48—49—50 and the weight of the draft door 70 and the weight 68 on the arm 10 forces the rods 53, 47 and 39 downwardly thereby positively closing the big valve 41. Now by opening the valve 65, the pressure above the diaphragm 49—50 is released again as above described.

The hole 38 serves as an air intake or exhaust to allow for the up and down action of the diaphragm 30—31.

Other types of valves may be used instead of the valve 65, or they may be used in conjunction with the valve 65 in the pipe 66,—for example: if it is desired to use the apparatus to adjust the fire under a boiler to maintain a certain steam pressure a steam pressure valve adapted to open and close at a certain pressure would be placed in the line 66 and the opening and closing of this valve would act the same as the opening or closing of the valve 65 and thus adjust the valve 41 to turn on or off the gas supply to the burner. Or if it is desired to use the apparatus to maintain a certain temperature in a room or building, a thermostatically operated valve would be placed in the line 66 and the opening and closing of this valve would act the same as the opening or closing of the valve 65 as affecting the working of the valve 41.

It is obvious that various combinations may be used with the apparatus so long as some sort of valve that will open and close is included in the line 66.

The invention is simple and effective and insures a perfectly served burner installation for the purposes intended. Such modifications may be employed as lie within the scope of the appended claim.

Having fully described my invention, what I now claim as new and desire to secure by Letters Patent is:

In a device of the class described; a valve enclosure having a division wall; a sleeve member in said wall and a valve seat thereon; an upper diaphragm enclosure and a lower diaphragm enclosure attached to said valve enclosure; a valve element adapted to open and close from said valve seat; a gas inlet pipe to the valve enclosure and a gas outlet pipe leading from the opposite side of the valve enclosure division wall; a hole at the base of the lower compartment formed by the division wall, said hole leading into the upper part of the lower diaphragm enclosure; a passage leading from the first chamber, of the valve enclosure, to the lower part of the upper diaphragm enclosure; diaphragm means in each diaphragm enclosure and vertically acting means passing openings through the bottom of the upper diaphragm and the top of the lower diaphragm enclosures and associated with the sleeve and valve element; a spring below the lower diaphragm element and means for adjusting said spring to exert a predetermined pressure upon the lower diaphragm; a hole through the upper diaphragm member connecting spaces above and below said member within the upper diaphragm enclosure; a pipe connecting the upper part of the upper diaphragm enclosure to the second valve enclosure and a valve in said pipe and a vent in the base of the lower diaphragm compartment; said vertically acting means including a lower shaft supported from the lower diaphragm element and terminating above the sleeve in a head for the valve seat and a second shaft superposed thereon passing the passage to a connection with the upper valve diaphragm; and a third shaft superposed thereon leading through a packing in the upper part of the upper diaphragm enclosure; a lever arm hinged to the upper part of the third shaft; said arm making a hinged connection to an upper portion of said upper diaphragm enclosure; an adjusting weight for the arm and means associated with the outer end of said arm leading to draft door elements.

In testimony whereof I affix my signature.

JOHN S. FULLER.